US012669333B2

(12) United States Patent
Yamauchi

(10) Patent No.: US 12,669,333 B2
(45) Date of Patent: Jun. 30, 2026

(54) ORIENTATION CALCULATION APPARATUS, ORIENTATION CALCULATION METHOD, IMAGING APPARATUS INCLUDING ORIENTATION CALCULATION APPARATUS, AND METHOD FOR CONTROLLING SAME

(71) Applicant: CANON KABUSHIKI KAISHA, Tokyo (JP)

(72) Inventor: Masaki Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 18/340,670

(22) Filed: Jun. 23, 2023

(65) Prior Publication Data
US 2023/0417553 A1    Dec. 28, 2023

(30) Foreign Application Priority Data
Jun. 27, 2022    (JP) ................................. 2022-102631

(51) Int. Cl.
| *G01C 21/16* | (2006.01) |
| *G01B 7/004* | (2006.01) |
| *H04N 23/68* | (2023.01) |

(52) U.S. Cl.
CPC ......... *G01C 21/1654* (2020.08); *G01B 7/004* (2013.01); *H04N 23/6812* (2023.01)

(58) Field of Classification Search
CPC . G01C 21/1654; G01B 7/004; H04N 23/6812
See application file for complete search history.

(56) References Cited

U.S. PATENT DOCUMENTS

| 2005/0217375 A1* | 10/2005 | Mase ................. G01C 19/5719 |
| | | 73/504.12 |
| 2010/0138180 A1* | 6/2010 | Sugihara .................. B25J 9/163 |
| | | 702/145 |
| 2021/0169417 A1* | 6/2021 | Burton ................. A61B 5/4857 |

FOREIGN PATENT DOCUMENTS

| JP | 2020181059 A | 11/2020 |
| JP | 2022069993 A | 5/2022 |

* cited by examiner

*Primary Examiner* — Tung S Lau
(74) *Attorney, Agent, or Firm* — Canon U.S.A., Inc. IP Division

(57) ABSTRACT

An orientation calculation apparatus includes one or more processors executing instructions in one or more memories to function as an obtaining unit, first and second calculation units, and first and second determination units. The obtaining unit obtains detection signals from a first and second sensor configured to detect movement of a moving apparatus. The first calculation unit calculates first orientation information about the moving apparatus based on an output of the first sensor. The second calculation unit calculates second orientation information about the moving apparatus by a method different from that for the first calculation unit based on the output of the first and second sensor. The first determination unit determines a state of movement of the moving apparatus based on the output of the second sensor. The second determination unit determines an orientation of the moving apparatus based on a result of determination made by the determination unit.

18 Claims, 5 Drawing Sheets

Figure 5:
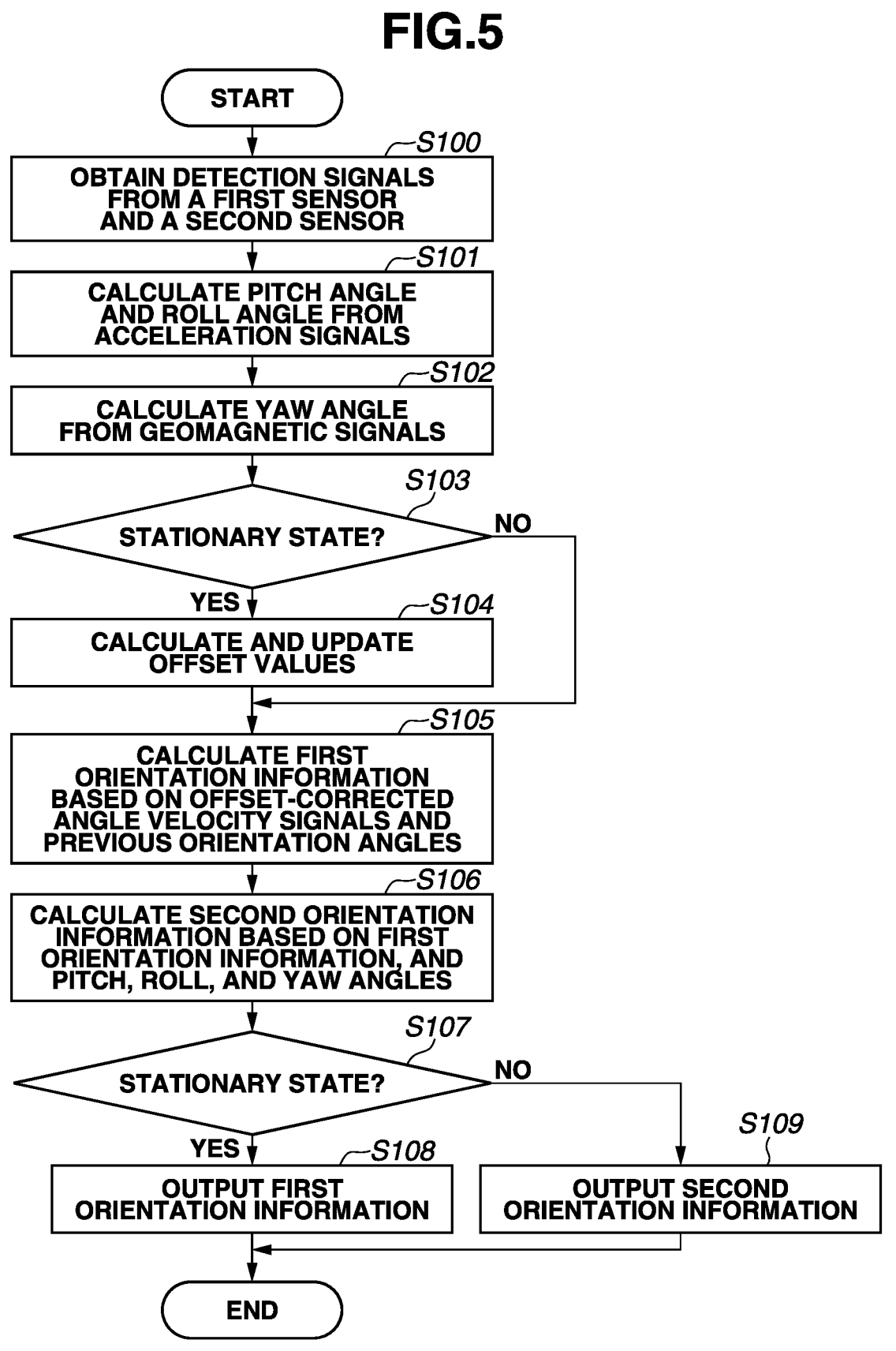

START

S100
OBTAIN DETECTION SIGNALS
FROM A FIRST SENSOR
AND A SECOND SENSOR

S101
CALCULATE PITCH ANGLE
AND ROLL ANGLE FROM
ACCELERATION SIGNALS

S102
CALCULATE YAW ANGLE
FROM GEOMAGNETIC SIGNALS

S103
STATIONARY STATE? — NO

YES ↓ S104
CALCULATE AND UPDATE
OFFSET VALUES

S105
CALCULATE FIRST
ORIENTATION INFORMATION
BASED ON OFFSET-CORRECTED
ANGLE VELOCITY SIGNALS AND
PREVIOUS ORIENTATION ANGLES

S106
CALCULATE SECOND ORIENTATION
INFORMATION BASED ON FIRST
ORIENTATION INFORMATION, AND
PITCH, ROLL, AND YAW ANGLES

S107
STATIONARY STATE? — NO

S109
YES ↓ S108
OUTPUT FIRST
ORIENTATION INFORMATION

OUTPUT SECOND
ORIENTATION INFORMATION

END

ORIENTATION CALCULATION APPARATUS, ORIENTATION CALCULATION METHOD, IMAGING APPARATUS INCLUDING ORIENTATION CALCULATION APPARATUS, AND METHOD FOR CONTROLLING SAME

BACKGROUND

Technical Field

One disclosed aspect of the embodiments relates to a technique for calculating orientation using a plurality of sensors for detecting movement.

Description of the Related Art

Some imaging apparatuses such as a video camera have a function of calculating a change in relative orientation from the output of an angular velocity sensor implemented therein. The orientation of an imaging apparatus is expressed by angles about three orthogonal axes, and the amount of change in orientation (angles) due to movement can be calculated by integrating angular velocity that is the output of the angular velocity sensor. However, the angular velocity sensor characteristically changes in the output in a low frequency band in particular due to temperature variations. As the temperature changes, the orientation obtained by integrating the angular velocity therefore deviates from the true value. Methods for reducing errors in the calculated angles of orientation due to a change in the output of the angular velocity sensor by using other types of sensors capable of detecting the movement of the imaging apparatus, such as an acceleration sensor and a geomagnetic sensor, in combination have thus been discussed.

Japanese Patent Application Laid-Open No. 2020-181059 discusses an orientation angle calculation apparatus that calculates an angle of an imaging apparatus by combining the output signals of an angular velocity sensor with those of an acceleration sensor and a geomagnetic sensor.

The outputs of the acceleration sensor and the geomagnetic sensor are less affected by errors in a low frequency band than the output of the angular velocity sensor, but contain a lot of high frequency noise. The accuracy of the calculated orientation angles can thus drop if the output signals of such sensors are constantly used.

SUMMARY

According to an aspect of the disclosure, an orientation calculation apparatus includes one or more processors and/or circuitry which functions as an obtaining unit, a first calculation unit, a second calculation unit, a first determination unit, and a second determination unit. The obtaining unit is configured to obtain detection signals from a first sensor configured to detect movement of a moving apparatus and a second sensor configured to detect the movement of the moving apparatus on a same axis as that of the movement detected by the first sensor. The first calculation unit is configured to calculate first orientation information about the moving apparatus based on an output of the first sensor. The second calculation unit is configured to calculate second orientation information about the moving apparatus by a method different from that for the first calculation unit based on the output of the first sensor and an output of the second sensor. The first determination unit is configured to determine a state of movement of the moving apparatus based on the output of the second sensor. The second determination unit is configured to determine an orientation of the moving apparatus based on a result of determination made by the first determination unit. The output of the first sensor includes less noise in a high frequency band and at least either a greater error component in a low frequency band or a greater variation in the error component than in the output of the second sensor. The second determination unit is configured to, with the state of movement of the moving apparatus obtained based on the output of the second sensor determined to be a first state, determine the first orientation information to be information indicating the orientation of the moving apparatus, and with the state of movement of the moving apparatus obtained based on the output of the second sensor determined to be a second state where the movement is greater than in the first state, determine the second orientation information to be the information indicating the orientation of the moving apparatus.

Further features of the disclosure will become apparent from the following description of exemplary embodiments with reference to the attached drawings.

BRIEF DESCRIPTION OF THE DRAWINGS

FIG. 1 is a block diagram of a camera according to an exemplary embodiment.

FIG. 5 is a flowchart illustrating processing by the orientation calculation unit according to the exemplary embodiment.

DESCRIPTION OF THE EMBODIMENTS

Figure 2A:
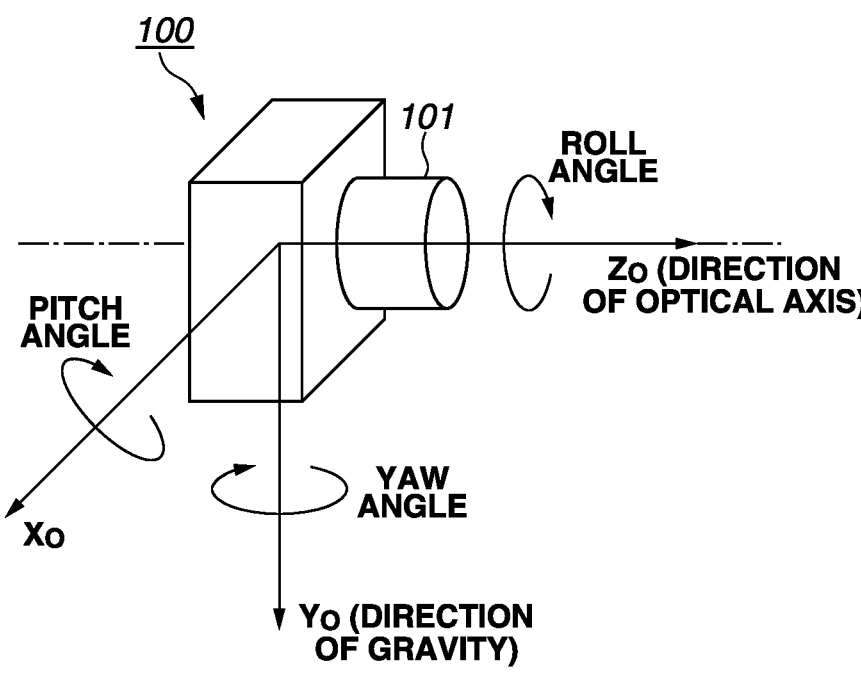
FIG. 2A is a conceptual diagram for describing an absolute coordinate system.

An exemplary embodiment of the disclosure will be described in detail below with reference to the attached drawings. In the drawings, similar members are denoted by the same reference numerals. A redundant description thereof will be omitted. The following exemplary embodiment is not intended to limit the disclosure set forth in the claims. While a plurality of features is described in the exemplary embodiment, not all of the plurality of features is not used in the disclosure, and the features may be combined in any given way. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

In the present exemplary embodiment, a configuration where a camera 100 (including a video camera) that is an imaging apparatus includes an orientation calculation apparatus inside will be described with reference to the drawings. The present exemplary embodiment deals with an orientation calculation apparatus capable of calculating accurate orientation angles in calculating orientation angles using a plurality of sensors.

Figure 1:
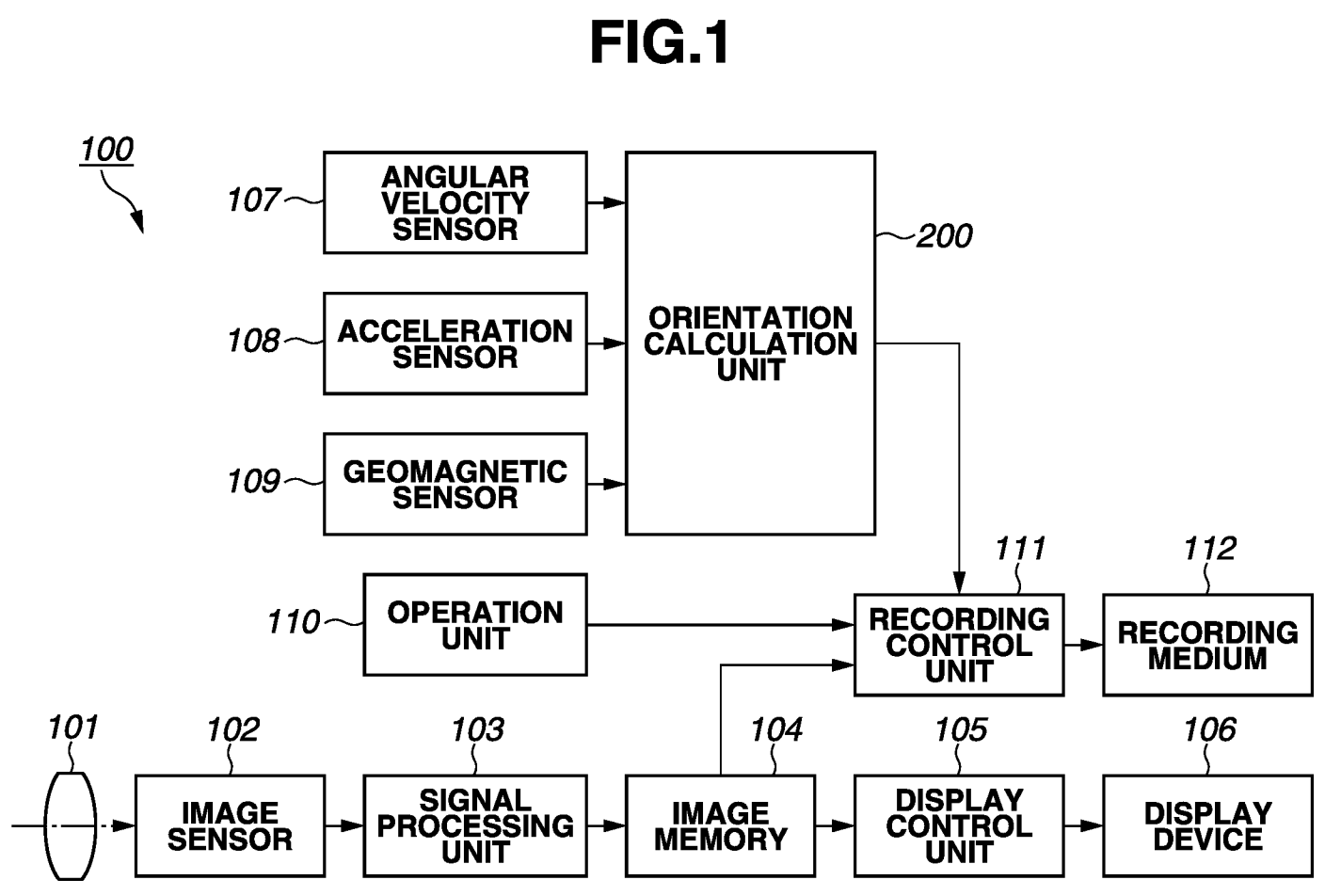

FIG. 1 is a block diagram illustrating a configuration of the camera 100 according to the present exemplary embodiment of the disclosure. The camera 100 is a lens-integrated digital camera for mainly capturing still images and moving images. However, the range of application of the present exemplary embodiment is not limited to lens-integrated digital cameras, and the disclosure is similarly applicable to interchangeable lens digital cameras. The present exemplary embodiment can also be applied to various imaging systems other than digital cameras.

An imaging lens 101 is an imaging optical system. For the sake of simplicity, FIG. 1 illustrates only one lens, whereas a zoom lens for zooming, an image shake correction lens, such as a shift lens for image shake correction, and a focus lens for focus adjustment can be included. With such a configuration, the imaging lens 101 forms an object image on an image sensor 102.

The image sensor 102 captures the object image formed by the imaging lens 101. The image sensor 102 photoelectrically converts the object image to accumulate electrical charges, and reads the charges to output an image signal including a plurality of pixels to a signal processing unit 103. The image sensor 102 includes a complementary metal-oxide-semiconductor (CMOS) image sensor, for example.

The signal processing unit 103 applies signal processing, such as white balance adjustment and gamma correction, to the image signal output from the image sensor 102 to generate a video signal including frame-by-frame image signals, and stores the video signal in an image memory 104. A display control unit 105 reads the video signal stored in the image memory 104 and displays an image on a display device 106. The display device 106 is a device capable of displaying images. For example, the display device 106 includes a liquid crystal display (LCD) panel.

An angular velocity sensor 107 is a sensor for detecting the angular velocity of a movement (vibration) acting on the camera 100, and functions as an angular velocity detection unit that detects angular velocities about three orthogonal detection axes, respectively. Details of the detection axes will be described below. An example of the angular velocity sensor 107 is a gyro sensor. As employed in the present exemplary embodiment and this specification, a sensor that detects the angular velocity of the movement acting on the camera 100, like the angular velocity sensor 107, is also referred to as detecting the movement of the camera 100. The angular velocity sensor 107 may include three separate angular velocity sensors that detect angular velocities about the respective detection axes, or may be integrated into a single unit. The angular velocity sensor 107 outputs angular velocity signals that are detection signals to an orientation calculation unit 200.

An acceleration sensor 108 is a sensor for detecting the acceleration of the movement (vibration) acting on the camera 100, and functions as an acceleration detection unit that detects acceleration on the three orthogonal detection axes. The direction of gravity can thereby be detected. As employed in the present exemplary embodiment and this specification, a sensor that detects the acceleration of the movement acting on the camera 100, like the acceleration sensor 108, is also referred to as detecting the movement of the camera 100. The acceleration sensor 108 may include three separate acceleration sensors that detect acceleration about the respective detection axes, or may be integrated into a single unit. The acceleration sensor 108 outputs acceleration signals that are detection signals to the orientation calculation unit 200.

A geomagnetic sensor 109 is a sensor for detecting the magnetism acting on the camera 100, and functions as a geomagnetism detection unit that detects the direction of the geomagnetism by detecting the magnetism on the three orthogonal detection axes. The geomagnetic sensor 109 is not a sensor that directly detects the movement itself of the camera 100 but can obtain the movement of the camera 100 based on a change in the direction of the geomagnetism. As employed in the present exemplary embodiment and this specification, a sensor that detects the direction of the geomagnetism acting on the camera 100, like the geomagnetic sensor 109, is also referred to as detecting the movement of the camera 100. The geomagnetic sensor 109 may include three separate geomagnetic sensors that detect the geomagnetism about the respective detection axes, or may be integrated into a single unit. The geomagnetic sensor 109 outputs geomagnetic signals that are detection signals to the orientation calculation unit 200.

The orientation calculation unit 200 performs calculation processing using the angular velocity signals output from the angular velocity sensor 107, the acceleration signals output from the acceleration sensor 108, and the geomagnetic signals output from the geomagnetic sensor 109. The orientation calculation unit 200 thereby calculates the current angles of the camera 100 (hereinafter, may be referred to as orientation angles) with respect to reference angles as information indicating the orientation of the camera 100 (hereinafter, may be referred to as orientation information).

A detailed orientation calculation method implemented by the orientation calculation unit 200 will be described below. The orientation calculation unit 200 outputs the calculated orientation information to a recording control unit 111.

An operation unit 110 obtains operation information about a start and a stop of video image (moving image) recording based on a user's camera operations. The operation unit 110 includes a touchscreen and switches, for example.

The recording control unit 111, if instructed to record a video image by the operation unit 110, outputs the video signal stored in the image memory 104 and the orientation information output from the orientation calculation unit 200 to a recording medium 112 in synchronization with each other, whereby the video signal and the orientation information are recorded on the recording medium 112. The recording medium 112 may be one built in the camera 100 or a portable one. The recording medium 112 is a semiconductor memory or a hard disk, for example.

Figure 2B:
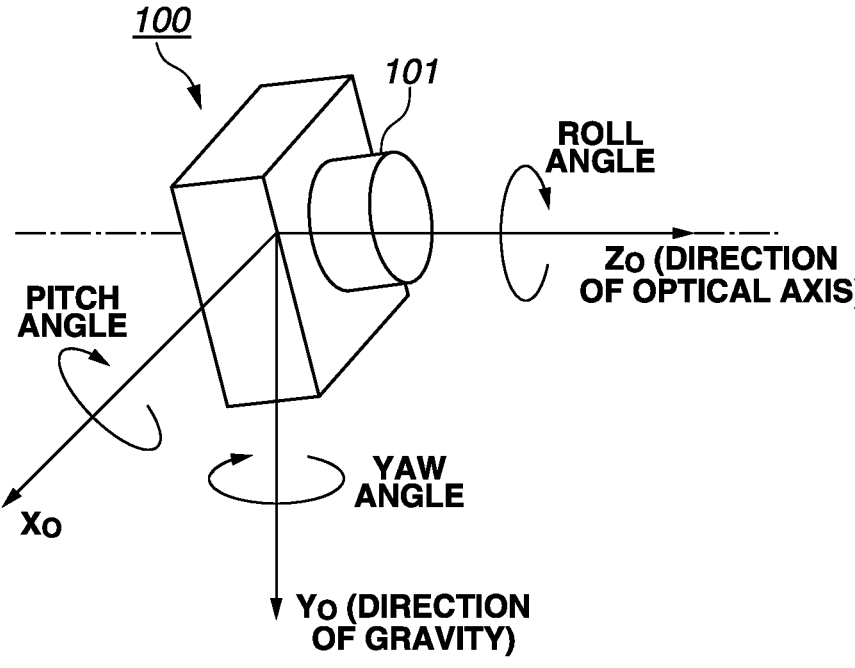
FIG. 2B is a conceptual diagram for describing the absolute coordinate system.

FIGS. 2A and 2B are diagrams illustrating an absolute coordinate system for expressing the orientation of the camera 100. The absolute coordinate system consists of three orthogonal axes. In the present exemplary embodiment, the three axes of the absolute coordinate system are denoted by $X_O$, $Y_O$, and $Z_O$. An eastward direction is defined as the $X_O$ axis, the direction of gravity as the $Y_O$ axis, and a northward direction as the $Z_O$ axis. The angle of rotation about the $X_O$ axis in the absolute coordinate system will be referred to as a pitch angle, the angle of rotation about the $Y_O$ axis a yaw angle, and the angle of rotation about the $Z_O$ axis a roll angle.

FIG. 2A is a diagram illustrating a relationship between the camera 100 and the absolute coordinates when the camera 100 is in a first orientation. FIG. 2B is a diagram illustrating the relationship between the camera 100 and the absolute coordinates when the orientation of the camera 100 has changed from the first orientation. The directions of the axes of the absolute coordinate system remain unchanged even if the orientation of the camera 100 (including the sensors mounted thereon) has changed.

In the present exemplary embodiment, a description will be given on the assumption that the orientation angles (pitch, yaw, and roll angles) in the first orientation where the optical axis of the imaging lens 101 falls on the $Z_O$ axis and the horizontal direction of the camera 100 on the $X_O$ axis as illustrated in FIG. 2A are zero angles. The angles of displacement with respect to the zero angles with the camera 100 in a specific orientation are referred to as initial angles. The initial angles are calculated by an acceleration angle calculation unit 201 and a geomagnetic angle calculation unit 202 to be described below. Relative angles with reference to the initial angles are then calculated as the orientation angles of the camera 100. The specific orientation is not limited in particular, and may be that of the camera 100 upon power-on or at the beginning of video image recording, for example. In such cases, the initial angles refer to the respective angles of displacement upon the power-on of the camera 100 or those at the beginning of the video image recording.

Figure 3A:
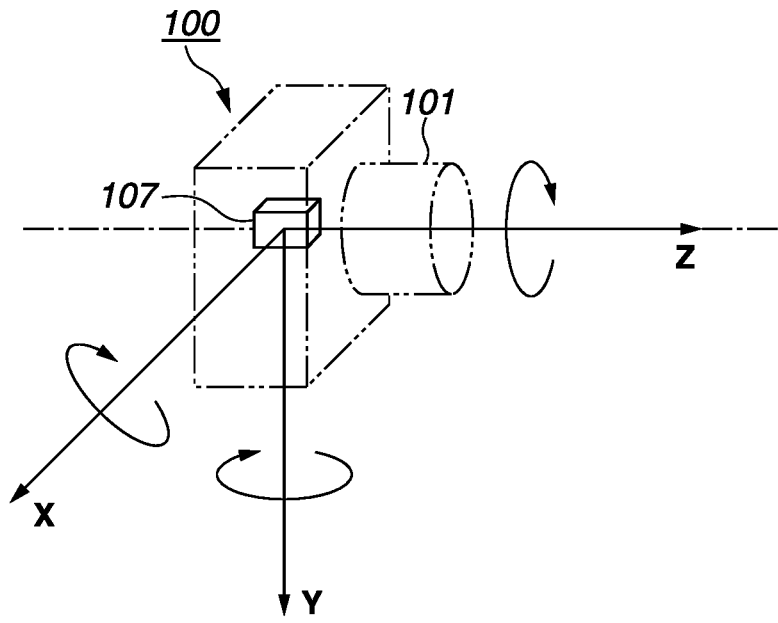
FIG. 3A is a conceptual diagram for describing a sensor coordinate system.
Figure 3B:
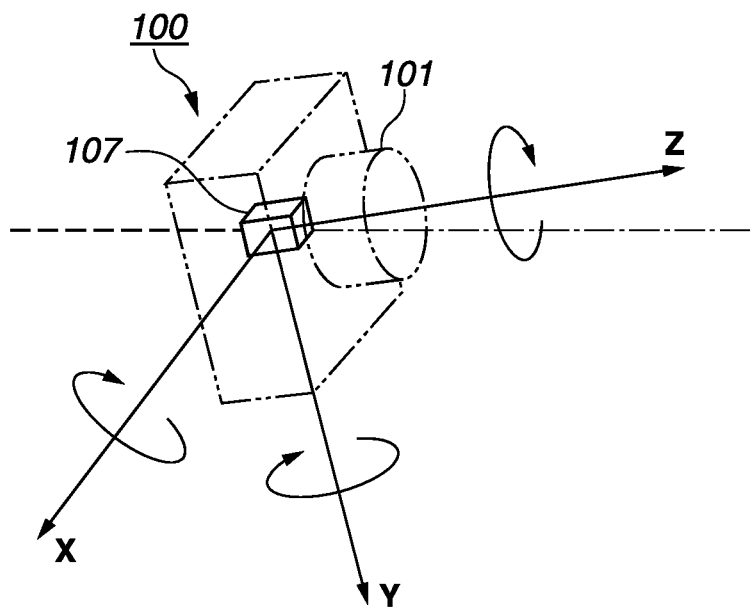
FIG. 3B is a conceptual diagram for describing the sensor coordinate system.

FIGS. 3A and 3B are diagrams illustrating a sensor coordinate system for expressing the detection direction of the angular velocity sensor 107. The sensor coordinate system consists of three orthogonal axes. In the present exemplary embodiment, the three axes of the sensor coordinate system are denoted by X, Y, and Z. The angular velocity sensor 107 detects the velocity of the angles of rotation about the X, Y, and Z axes. With the camera 100 in the foregoing first orientation, the X, Y, and Z, three axes of the sensor coordinate system are in the same directions as those of the $X_O$, $Y_O$, and $Z_O$ axes of the absolute coordinate system, respectively.

FIG. 3A is a diagram illustrating a relationship between the camera 100 and the sensor coordinates when the camera 100 to which the angular velocity sensor 107 is fixed is in the first orientation (at the beginning of video image recording). FIG. 3B is a diagram illustrating the relationship between the camera 100 and the sensor coordinates when the orientation of the camera 100 has changed from the first orientation. As the orientation of the camera 100 changes, the sensor coordinate system rotates by a rotation angle corresponding to the change and the directions of the respective axes (X, Y, and Z) change. To calculate the orientation of the camera 100 from the output of the angular velocity sensor 107, the output will therefore be converted from the sensor coordinate system into the absolute coordinate system. The conversion method will be described below.

While only the angular velocity sensor 107 has been described with reference to FIGS. 3A and 3B, the outputs of the acceleration sensor 108 and the geomagnetic sensor 109 are also expressed on the sensor coordinate system, and will therefore be converted into the absolute coordinate system. In the present exemplary embodiment, the detection axes of the angular velocity sensor 107, the acceleration sensor 108, and the geomagnetic sensor 109 are assumed to be in line with the axes X, Y, Z, respectively. If the detection axes of the sensors deviate from each other, the orientation can be similarly detected by correcting the deviations.

The calculation of the orientation information by the orientation calculation unit 200 will now be described. The orientation calculation unit 200 includes a first calculation unit and a second calculation unit that calculate orientation information using respective different methods. The orientation calculation unit 200 determines whether the orientation information calculated by either calculation unit is selected as the orientation information about the camera 100 based on the magnitude of the movement of the camera 100, and outputs the orientation information. With a small movement of the camera 100, the orientation calculation unit 200 selects the first calculation unit. The first calculation unit calculates orientation information based on the output of the angular velocity sensor 107 that produces less noise components in a high frequency band but is more likely to cause errors in a low frequency band and changes in the errors than the acceleration sensor 108 and the geomagnetic sensor 109. With a large movement of the camera 100, the orientation calculation unit 200 selects the second calculation unit. The second calculation unit calculates orientation information based also on the outputs of the acceleration sensor 108 and the geomagnetic sensor 109 in addition to that of the angular velocity sensor 107. In such a manner, the orientation calculation unit 200 calculates the orientation by using the acceleration sensor 108 and the geomagnetic sensor 109 as well in situations where errors are likely to occur in calculating the orientation information based only on the output of the angular velocity sensor 107. The orientation information where the effect of errors in the low frequency band and noise components in the high frequency band is reduced can thus be calculated.

Figure 4:
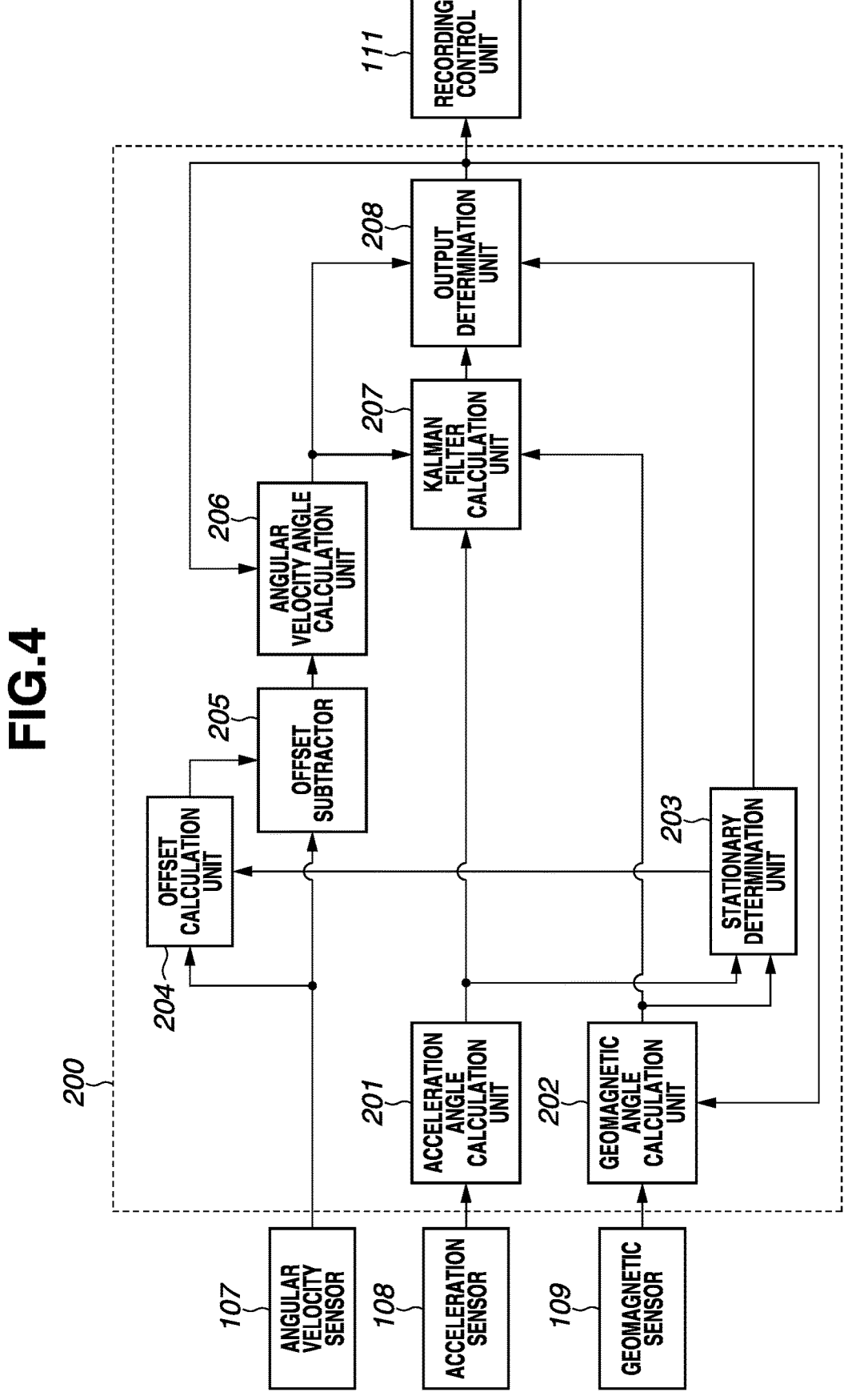
FIG. 4 is a block diagram of an orientation calculation unit according to the exemplary embodiment.

The calculation of the orientation information by the orientation calculation unit 200 will be described in detail with reference to FIGS. 4 and 5. FIG. 4 is a block diagram illustrating a configuration of the orientation calculation unit 200. FIG. 5 is a flowchart illustrating a processing procedure by the orientation calculation unit 200. The processing illustrated in FIG. 5 is repeated every a predetermined period.

The blocks constituting the orientation calculation unit 200 will be described. The acceleration angle calculation unit 201 calculates a pitch angle $\theta_A$ and a roll angle $\varphi_A$ in the absolute coordinate system from X-, Y-, and Z-axis acceleration signals $A_x$, $A_y$, and $A_z$ in the sensor coordinate system, output from the acceleration sensor 108 by the following Eqs. 1 and 2:

$$\theta_A = \tan^{-1} \frac{-A_z}{\sqrt{A_x^2 + A_y^2}} \qquad \text{(Eq. 1)}$$

$$\varphi_A = \tan^{-1} \frac{A_x}{A_z} \qquad \text{(Eq. 2)}$$

The calculations are output to a stationary determination unit 203 and a Kalman filter calculation unit 207.

The geomagnetic angle calculation unit 202 calculates the yaw angle in the absolute coordinate system from X-, Y-, and Z-axis geomagnetic signals $M_x$, $M_y$, and $M_z$ in the sensor coordinate system, output from the geomagnetic sensor 109. The geomagnetic angle calculation unit 202 initially calculates $X_O$-, $Y_O$-, and $Z_O$-axis geomagnetic signals $M_x'$, $M_y'$, and $M_z'$ in the absolute coordinate system from the geomagnetic signals $M_x$, $M_y$, and $M_z$ expressed in the sensor coordinate system and orientation angles (yaw, pitch, and roll angles $\psi$, $\theta$, and $\varphi$) output from an output determination unit 208 to be described below by using the following Eq. 3:

$$\begin{bmatrix} M_z' \\ M_x' \\ M_y' \end{bmatrix} = \begin{bmatrix} \cos\theta & \sin\varphi\sin\theta & \cos\varphi\sin\theta \\ 0 & \cos\varphi & -\sin\varphi \\ -\sin\theta & \sin\varphi\cos\theta & \cos\varphi\cos\theta \end{bmatrix} \begin{bmatrix} M_z \\ M_x \\ M_y \end{bmatrix}. \qquad \text{(Eq. 3)}$$

The orientation angles $\psi$, $\theta$, and $\varphi$ output from the output determination unit 208 may be referred to as third orientation information.

The geomagnetic angle calculation unit 202 calculates a yaw angle $\psi_M$ from the calculated geomagnetic signals in the absolute coordinate system by Eq. 4:

$$\psi_M = \tan^{-1}\left(-\frac{M_x'}{M_z'}\right). \qquad \text{(Eq. 4)}$$

The calculation is output to the stationary determination unit 203 and the Kalman filter calculation unit 207.

The stationary determination unit 203 functions as a determination unit that determines the state of movement occurring on the camera 100 using the pitch angle $\theta_A$ and the roll angle $\varphi_A$ output from the acceleration angle calculation unit 201 and the yaw angle $\psi_M$ output from the geomagnetic angle calculation unit 202. The stationary determination unit 203 according to the present exemplary embodiment determines whether the camera 100 is stationary as the state of movement, and outputs the determination result (stationary state/nonstationary state) to an offset calculation unit 204 and the output determination unit 208. For example, the stationary determination unit 203 determines that the camera 100 is in the stationary state if output varying widths of the pitch angle $\theta_A$, the roll angle $\varphi_A$, and the yaw angle $\psi_M$ in a predetermined time fall within respective predetermined values. The stationary determination unit 203 determines the state of movement occurring on the camera 100 based on the outputs of the acceleration sensor 108 and the geomagnetic sensor 109 that cause smaller errors in the low frequency band than the angular velocity sensor 107. The state of movement can thus be determined more accurately than based on the output of the angular velocity sensor 107.

The offset calculation unit 204 calculates offset values included in the angular velocity signals output from the angular velocity sensor 107. The offset values calculated by the offset calculation unit 204 will hereinafter be referred to as offset calculation values. In the present exemplary embodiment, new offset values are calculated and output to update the offset calculation values only if the camera 100 is determined to be in the stationary state by the stationary determination unit 203. On the other hand, if the camera 100 is determined to be in the nonstationary state, the offset values are not calculated or updated, and the previous offset calculation values are output. In the present exemplary embodiment, the offset calculation values are averages of the angular velocity signals output in a predetermined period. Alternatively, low frequency band components extracted by applying low-pass filter processing to the angular velocity signals output in a predetermined period may be output as the offset calculation values instead of the averages.

An offset subtractor 205 subtracts the offset calculation values output from the offset calculation unit 204 from the angular velocity signals output from the angular velocity sensor 107, and outputs the resulting offset-corrected angular velocity signals to an angular velocity angle calculation unit 206.

The angular velocity angle calculation unit 206 functions as a first calculation unit that calculates orientation information about the camera 100 based on the angular velocity. The angular velocity angle calculation unit 206 calculates the orientation angles of the camera 100 in the absolute coordinate system based on the offset-corrected angular velocity signals output from the offset subtractor 205 and the orientation angles output from the output determination unit 208 to be described below, and outputs the calculated orientation angles. The orientation angles (yaw, pitch, and roll angles $\psi_G$, $\theta_G$, and $\varphi_G$) calculated by the angular velocity angle calculation unit 206 may hereinafter be referred to as first orientation information.

A method for calculating the orientation angles of the camera 100 in the absolute coordinate system by the angular velocity angle calculation unit 206 will be described. The angular velocity angle calculation unit 206 initially converts the offset-corrected angular velocity signals (yaw, pitch, and roll angular velocity signals $\omega_y$, $\omega_x$, and $\omega_z$) expressed in the sensor coordinate system into yaw, pitch, and roll angular velocity signals $\dot{\psi}_G$, $\dot{\theta}_G$, and $\dot{\varphi}_G$ in the absolute coordinate system using the orientation angles $\psi$, $\theta$, and $\varphi$ output from the output determination unit 208 to be described below as expressed by the following Eq. 5:

$$\begin{bmatrix} \dot{\psi}_G \\ \dot{\theta}_G \\ \dot{\varphi}_G \end{bmatrix} = \begin{bmatrix} 0 & \sin\varphi\sec\theta & \cos\varphi\sec\theta \\ 0 & \cos\varphi & -\sin\varphi \\ 1 & \sin\varphi\tan\theta & \cos\varphi\tan\theta \end{bmatrix} \begin{bmatrix} \omega_z \\ \omega_x \\ \omega_y \end{bmatrix}. \qquad \text{(Eq. 5)}$$

Next, the angular velocity angle calculation unit 206 integrates the calculated yaw, pitch, and roll angular velocity signals $\dot{\psi}_G$, $\dot{\theta}_G$, and $\dot{\varphi}_G$ in the absolute coordinate system to calculate the orientation angles $\psi_G$, $\theta_G$, and $\varphi_G$ in the absolute coordinate system as expressed by the following Eq. 6:

$$\begin{bmatrix} \psi_{G(t)} \\ \theta_{G(t)} \\ \varphi_{G(t)} \end{bmatrix} = \begin{bmatrix} \dot{\psi}_{G(t)} \\ \dot{\theta}_{G(t)} \\ \dot{\varphi}_{G(t)} \end{bmatrix} + \begin{bmatrix} \psi_{G(t-1)} \\ \theta_{G(t-1)} \\ \varphi_{G(t-1)} \end{bmatrix}. \qquad \text{(Eq. 6)}$$

The integrators $\psi_{G(t-1)}$, $\theta_{G(t-1)}$, and $\varphi_{G(t-1)}$ of the angular velocity signals at the beginning of the video image recording (t=0) are 0. As the time elapses, the angular velocity signals are detected and the integration of the angular velocity proceeds.

The angular velocity angle calculation unit 206 outputs the calculated orientation angles $\psi_G$, $\theta_G$, and $\varphi_G$ in the absolute coordinate system to the Kalman filter calculation unit 207 and the output determination unit 208.

The Kalman filter calculation unit 207 functions as a second calculation unit that calculates second orientation information using the detection results of the acceleration sensor 108 and the geomagnetic sensor 109 in addition to the orientation angles $\psi_G$, $\theta_G$, and $\varphi_G$ output from the angular velocity angle calculation unit 206. Specifically, the Kalman filter calculation unit 207 inputs the orientation angles $\psi_G$, $\theta_G$, and $\varphi_G$ output from the angular velocity angle calculation unit 206, the pitch angle $\theta_A$ and the roll angle $\varphi_A$ output from the acceleration angle calculation unit 201, and the yaw angle $\psi_M$ output from the geomagnetic angle calculation unit 202 into a Kalman filter. The Kalman filter calculation unit 207 thereby calculates the second orientation information (yaw, pitch, and roll angles $\psi_K$, $\theta_K$, and $\varphi_K$) where the errors included in the respective outputs are reduced.

A method for calculating the second orientation information by the Kalman filter calculation unit 207 will now be described.

The Kalman filter is a filter for estimating an optimum state value in real time using a state equation and an observation equation. Since the Kalman filter is a conventional technique, a detailed description thereof will be omitted. As expressed by Eq. 7, suppose that a state value $x_{(t)}$ of the Kalman filter consists of the orientation angles $\psi_K$, $\theta_K$, and $\varphi_K$ to be determined, and an observation value $y_{(t)}$ the orientation angles $\psi_M$, $\theta_A$, and $\varphi_A$ output from the acceleration angle calculation unit 201 and the geomagnetic angle calculation unit 202. Suppose also that an input value $u_{(t)}$ consists of the orientation angles $\psi_G$, $\theta_G$, and $\varphi_G$ output from the angular velocity angle calculation unit 206. The state equation and the observation equation are given by Eq. 8:

$$x_{(t)} = \begin{bmatrix} \psi_{K(t)} \\ \theta_{K(t)} \\ \varphi_{K(t)} \end{bmatrix}, \; y_{(t)} = \begin{bmatrix} \psi_{M(t)} \\ \theta_{A(t)} \\ \varphi_{A(t)} \end{bmatrix}, \text{ and } u_{(t)} = \begin{bmatrix} \psi_{G(t)} \\ \theta_{G(t)} \\ \varphi_{G(t)} \end{bmatrix}, \text{ and} \quad \text{(Eq. 7)}$$

$$\begin{cases} x_{(t+1)} = x_{(t)} + u_{(t)} + v_{(t)} \\ \quad y_{(t)} = x_{(t)} + w_{(t)} \end{cases}. \quad \text{(Eq. 8)}$$

Here, process noise $v_{(t)}$ and observation noise $w_{(t)}$ are set to appropriate values based on conventional techniques, with possible noise and errors of the sensors (angular velocity sensor 107, acceleration sensor 108, and geomagnetic sensor 109) taken into consideration.

The output determination unit 208 determines which to output as the orientation information about the camera 100, the first orientation information or the second orientation information, depending on the stationary determination result of the camera 100 made by the stationary determination unit 203. The output determination unit 208 then outputs the determined orientation information to the recording control unit 111 as the third orientation information ($\psi$, $\theta$, and $\varphi$). If the stationary determination result indicates that the camera 100 is in the stationary state, the output determination unit 208 outputs the first orientation information ($\psi_G$, $\theta_G$, and $\varphi_G$) output from the angular velocity angle calculation unit 206 as the third orientation information ($\psi$, $\theta$, and $\varphi$). On the other hand, if the stationary determination result indicates that the camera 100 is in the nonstationary state, the output determination unit 208 outputs the second orientation information ($\psi_K$, $\theta_K$, and $\varphi_K$) output from the Kalman filter calculation unit 207 as the third orientation information ($\psi$, $\theta$, and $\varphi$).

A procedure for calculating the orientation information by the orientation calculation unit 200 thus configured will now be described with reference to the flowchart of FIG. 5.

In step S100, the orientation calculation unit 200 obtains detection signals from a first sensor and a second sensor. The first sensor is configured to detect movement of a moving apparatus. The second sensor is configured to detect the movement of the moving apparatus on a same axis as that of the movement detected by the first sensor. In one embodiment, the first sensor is the angular velocity sensor 107 and the second sensor is the acceleration sensor 108, the geomagnetic sensor 109, or both. (Please edit as appropriate)

In step S101, the acceleration angle calculation unit 201 initially calculates the pitch angle $\theta_A$ and the roll angle $\varphi_A$ in the absolute coordinate system from the acceleration signals $A_x$, $A_y$, and $A_z$ in the sensor coordinate system, output from the acceleration sensor 108.

In step S102, the geomagnetic angle calculation unit 202 calculates the yaw angle $\psi_M$ in the absolute coordinate system from the geomagnetic signals $M_x$, $M_y$, and $M_z$ in the sensor coordinate system, output from the geomagnetic sensor 109.

In step S103, the stationary determination unit 203 determines whether the camera 100 is stationary, using the pitch angle $\theta_A$ and the roll angle $\varphi_A$ calculated in step S101 and the yaw angle $\psi_M$ calculated in step S102. If the camera 100 is determined to be in the stationary state (YES in step S103), the processing proceeds to step S104. If the camera 100 is determined to not be in the stationary state (to be in the nonstationary state; NO in step S103), the processing proceeds to step S105.

In step S104, the offset calculation unit 204 calculates offset values included in the angular velocity signals output from the angular velocity sensor 107, and updates the offset values calculated the last time in step S104. The processing proceeds to step S105.

In step S105, the angular velocity angle calculation unit 206 calculates the first orientation information ($\psi_G$, $\theta_G$, and $\varphi_G$) about the camera 100 based on the offset-corrected angular velocity signals $\omega_y$, $\omega_x$, and $\omega_z$ of and the orientation angles $\psi$, $\theta$, and $\varphi$ output from the output determination unit 208 the last time.

In step S106, the Kalman filter calculation unit 207 calculates the second orientation information ($\psi_K$, $\theta_K$, and $\varphi_K$) based on the first orientation information ($\psi_G$, $\theta_G$, and $\varphi_G$) calculated in step S105 and the pitch angle $\theta_A$, the roll angle $\varphi_A$, and the yaw angle $\psi_M$ output from the acceleration angle calculation unit 201 and the geomagnetic angle calculation unit 202.

In step S107, the output determination unit 208 refers to the result of the determination made by the stationary determination unit 203 in step S103. If the determination result indicates that the camera 100 is in the stationary state (i.e., the processing has reached step S107 via step S104; YES in step S107), the processing proceeds to step S108. If the determination result does not indicate that the camera 100 is in the stationary state (i.e., the processing has reached step S107 not via step S104; NO in step S107), the processing proceeds to step S109.

In step S108, the output determination unit 208 outputs the first orientation information calculated based on the output of the angular velocity sensor 107 as the orientation information about the camera 100. If step S108 is executed, the effect of error components in the low frequency band included in the output of the angular velocity sensor 107 is expected to be sufficiently reduced by the subtraction of the offset calculation values since the camera 100 is in the stationary state. The first orientation information less affected by noise in the high frequency band than the second orientation information is therefore output as the orientation information about the camera 100.

On the other hand, in step S109, the output determination unit 208 outputs the second orientation information calculated based on the outputs of the angular velocity sensor 107, the acceleration sensor 108, and the geomagnetic sensor 109 as the orientation information about the camera 100. If step S109 is executed, the orientation information is calculated based also on the detection results of the acceleration sensor 108 and the geomagnetic sensor 109 since the camera 100 is in the nonstationary state and the low frequency components due to the movement of the camera 100 are difficult to separate from errors.

As has been described above, according to the present exemplary embodiment, the orientation angles of the camera 100 can be calculated while reducing the effect of high frequency noise included in the outputs of the acceleration sensor 108 and the geomagnetic sensor 109 and accurately correcting the effect of temperature-based errors of the angular velocity sensor 107 in the low frequency band or variations in the errors.

[Modifications]

In the foregoing exemplary embodiment, a method for calculating the orientation of the camera 100 as relative angles with respect to the initial angles has been described, with the state where the optical axis of the imaging lens 101 falls on the $Z_O$ axis and the horizontal direction of the camera main body falls on the $X_O$ axis as the zero angles. However, the orientation to be set as the zero angles is not limited in particular. For example, a state with some tilt in the pitch angle may be set as the zero angles.

In the foregoing exemplary embodiment, the angular velocity sensor 107 is described to be a first sensor of which error components in the low frequency or variations in the error components are greater and noise components in the high frequency band are smaller than those of a second sensor.

The acceleration sensor 108 and the geomagnetic sensor 109 are described to be second sensors of which error components in the low frequency band or variations in the error components are smaller and noise components in the high frequency band are greater than those of the first sensor. However, the sensors to be used are not limited thereto. If other sensors capable of obtaining angle information are used, one of the sensors of which error components in the low frequency band or variations in the error components are relatively large and noise components in the high frequency band are relatively small is substituted for the angular velocity sensor 107 according to the foregoing exemplary embodiment. Sensors of which error components in the low frequency band or variations in the error components are relatively small and noise components in the high frequency band are relatively large are substituted for the acceleration sensor 108 and the geomagnetic sensor 109 according to the foregoing exemplary embodiment. Orientation information can thereby be calculated in a similar manner to in the foregoing exemplary embodiment.

In the foregoing exemplary embodiment, which to use as the orientation information about the camera 100, the orientation information calculated by the first calculation unit or the orientation information calculated by the second calculation unit, is selected based on whether the camera 100 is stationary. However, the disclosure is not limited thereto. Suppose, for example, that the camera 100 is not stationary in a strict sense but moving so slightly that the orientation calculated based on the output of the angular velocity sensor 107 is considered to be rather higher in accuracy. The orientation calculation unit 200 may be configured so that the first orientation information is output as the orientation information about the camera 100 in such a case. In other words, the orientation calculation unit 200 may output the first orientation information as the orientation information about the camera 100 if the movement of the camera 100 is in a first state. Here, the first state may refer to either where the camera 100 is stationary or where the camera 100 is moving only slightly as described above.

In the foregoing exemplary embodiment, the camera 100 that is an imaging apparatus is described to include the orientation calculation apparatus. However, the orientation calculation apparatus is not limited thereto. A moving apparatus for the orientation calculation apparatus to calculate the orientation of is not limited to an imaging apparatus, either.

For example, an orientation calculation apparatus that has the functions of the foregoing exemplary embodiment and functions as a tilt angle detection apparatus for calculating a tilt angle as the orientation of a vehicle body is also included in the present exemplary embodiment. As employed in the present exemplary embodiment and this specification, a moving apparatus refers to not only a moving body that includes a driving unit and can move by itself (including vehicles such as an automobile and a train car, and aircraft such as a drone), but also a portable apparatus of which orientation can be changed by the user or a moving body. Specific examples other than the imaging apparatus include a mobile phone (smartphone), a tablet, a personal computer, a head-mounted display, and smartglasses.

The orientation calculation apparatus does not necessarily need to be implemented in the moving apparatus. The orientation calculation apparatus may be installed at a position away from the moving apparatus and configured to not move integrally with the moving apparatus as long as the orientation calculation apparatus can receive the detection signals from the various sensors disposed in the moving apparatus. The orientation calculation apparatus may be configured so that the detection signals can be received or obtained using wired or wireless communication.

In the foregoing exemplary embodiment, the Kalman filter calculation unit 207 calculates the second orientation information even if the camera 100 is in the stationary state. However, if the camera 100 is in the stationary state and the output determination unit 208 selects the output of the angular velocity angle calculation unit 206 as the output from the orientation calculation unit 200, the calculation of the second orientation information by the Kalman filter calculation unit 207 may be temporarily suspended.

For example, step S106 of calculating the second orientation information ($\psi_K$, $\theta_K$, and $\varphi_K$) may be performed after the camera 100 is determined to not be in the stationary state in step S107.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computerreadable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the exemplary embodiments of the disclosure have been described above in detail, the disclosure is not limited to such specific exemplary embodiments, and various modes not departing from the gist of this disclosure are also included in the disclosure. Some of the foregoing exemplary embodiments may be combined as appropriate.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-102631, filed Jun. 27, 2022, which is hereby incorporated by reference herein in its entirety.

What is claimed is:

1. An orientation calculation apparatus comprising one or more processors and/or circuitry which functions as:

an obtaining unit configured to obtain detection signals from a first sensor configured to detect movement of a moving apparatus and a second sensor configured to detect the movement of the moving apparatus on a same axis as that of the movement detected by the first sensor;

a first calculation unit configured to calculate first orientation information about the moving apparatus, by a first method, based on an output of the first sensor;

a second calculation unit configured to calculate second orientation information about the moving apparatus, by a second method different from the first method, based on the output of the first sensor and an output of the second sensor; and a first determination unit configured to determine a state of movement of the moving apparatus based on the output of the second sensor, wherein the second sensor of which error components in a low frequency band or variations in the error components are smaller and noise components in the high frequency band are greater than those of the first sensor, when the state of movement of the moving apparatus obtained based on the output of the second sensor is determined to be a first state, an orientation information about the moving apparatus is obtained by the first method based on the output of the first sensor, and when the state of movement of the moving apparatus obtained based on the output of the second sensor is determined to be a second state where the movement is greater than in the first state, the orientation information about the moving apparatus is obtained by the second method based on the output of the first sensor and the output of the second sensor.

2. The orientation calculation apparatus according to claim 1, wherein the orientation information obtained by the first method and the orientation information obtained by the second method each include angle information about a yaw angle, a pitch angle, and a roll angle of the moving apparatus with respect to a predetermined orientation.

3. The orientation calculation apparatus according to claim 1, wherein the first sensor is configured to detect the movement of the moving apparatus on three axes, and wherein the second sensor is configured to detect the movement of the moving apparatus on three axes.

4. The orientation calculation apparatus according to claim 1, wherein the first calculation unit is configured to calculate the first orientation information based on a signal obtained by applying low-pass filter processing to the output of the first sensor.

5. The orientation calculation apparatus according to claim 1, wherein the first method is calculating the orientation information based on a signal obtained by subtracting an average of the output of the first sensor in a predetermined period from the output of the first sensor.

6. The orientation calculation apparatus according to claim 1, wherein the first sensor is an angular velocity sensor configured to detect angular velocity of the movement of the moving apparatus, and wherein the second sensor is at least either an acceleration sensor configured to detect acceleration of the movement of the moving apparatus or a geomagnetic sensor configured to detect a change in a direction of the moving apparatus.

7. The orientation calculation apparatus according to claim 6, wherein the orientation information obtained by the first method and the orientation information obtained by the second method each indicate a yaw angle, a pitch angle, and a roll angle of the moving apparatus, wherein the second sensor includes the geomagnetic sensor and the acceleration sensor, and wherein the second method is configured to calculate the yaw angle based on an output of the geomagnetic sensor and an output of the angular velocity sensor, and calculate the pitch angle and the roll angle based on an output of the acceleration sensor and the output of the angular velocity sensor.

8. The orientation calculation apparatus according to claim 1, wherein the first state is a state where the moving apparatus is stationary.

9. The orientation calculation apparatus according to claim 1, wherein the second method is calculating the second orientation information by inputting a signal based on the output of the first sensor and a signal based on the output of the second sensor to a Kalman filter.

10. An imaging apparatus comprising:

an image sensor configured to capture an object image formed by an imaging optical system; and the orientation calculation apparatus according to claim 1, wherein the orientation of the moving apparatus for the orientation calculation apparatus to calculate is that of the imaging apparatus.

11. The imaging apparatus according to claim 10, wherein the processor(s) and/or circuitry further functions as a recording control unit configured to control recording of an image signal output by the image sensor, and wherein the recording control unit is configured to record the image signal and the orientation of the imaging apparatus in synchronization with each other.

12. The imaging apparatus according to claim 10, further comprising the first sensor and the second sensor.

13. A moving body comprising:

a driving unit; and the orientation calculation apparatus according to claim 1, wherein the orientation of the moving apparatus for the orientation calculation apparatus to calculate is that of the moving body.

14. The orientation calculation apparatus according to claim 1, wherein one or more processors and/or circuitry further function as a second determination unit configured to determine an orientation of the moving apparatus based on a result of determination made by the first determination unit, when the first determination unit determines that the moving apparatus is in the first state, the second determination unit determines an orientation information calculated by the first calculation unit to be the orientation of the moving apparatus, and when the first determination unit determines that the moving apparatus is in the second state, the second determination unit determines an orientation information calculated by the second calculation unit to be the orientation of the moving apparatus.

15. The orientation calculation apparatus according to claim 1, wherein the first calculation unit calculates the first orientation information about the moving apparatus by the first method without using the output of the second sensor.

16. The orientation calculation apparatus according to claim 1, wherein depending on a state of the moving apparatus determined based on the output of the second sensor, a sensor to be used for calculating the orientation information of the moving apparatus is changed.

17. The orientation calculation apparatus according to claim 1, wherein the output of the first sensor includes less noise in a high frequency band and at least either a greater error component in a low frequency band or a greater variation in the error component than in the output of the second sensor.

18. A method for controlling an orientation calculation apparatus configured to calculate information indicating an orientation of a moving apparatus, the method comprising:

obtaining detection signals from a first sensor configured to detect movement of the moving apparatus and a second sensor configured to detect the movement of the moving apparatus on a same axis as that of the movement detected by the first sensor;

calculating information indicating a first orientation of the moving apparatus, by a first method, as a first calculation based on an output of the first sensor;

calculating information indicating a second orientation of the moving apparatus as a second calculation by a second method different the first method, based on the output of the first sensor and an output of the second sensor; and determining a state of movement of the moving apparatus as a determination based on the output of the second sensor, wherein the second sensor of which error components in a low frequency band or variations in the error components are smaller and noise components in the high frequency band are greater than those of the first sensor, when the state of movement of the moving apparatus obtained based on the output of the second sensor is determined to be a first state, an orientation information about the moving apparatus is obtained by the first method based on the output of the first sensor, and when the state of movement of the moving apparatus obtained based on the output of the second sensor is determined to be a second state where the movement is greater than in the first state, the orientation information about the moving apparatus is obtained by the second method based on the output of the first sensor and the output of the second sensor.

\* \* \* \* \*